United States Patent

Deem et al.

[15] 3,645,585
[45] Feb. 29, 1972

[54] BRAKE-BALANCING VALVE WITH BRAKE TAPE COMPENSATING MEANS

[72] Inventors: Brian C. Deem; Guenter K. Herold, both of Elyria, Ohio

[73] Assignee: Bendix-Westinghouse Automotive Air Brake Company, Elyria, Ohio

[22] Filed: Feb. 9, 1970

[21] Appl. No.: 9,797

[52] U.S. Cl. .............................................303/22 R, 303/60
[51] Int. Cl. ...........................................................B60t 8/18
[58] Field of Search......................303/22 R, 22 A, 60, 6, 40; 188/195

[56] References Cited

UNITED STATES PATENTS

| | | | |
|---|---|---|---|
| 3,302,982 | 2/1967 | Perrue | 303/22 X |
| 3,404,922 | 10/1968 | Valentine | 303/22 R X |
| 3,228,731 | 1/1966 | Valentine | 303/22 R X |
| 3,285,674 | 11/1966 | Eaton | 303/22 R X |

Primary Examiner—Milton Buchler
Assistant Examiner—John J. McLaughlin
Attorney—Scrivener, Parker, Scrivener and Clarke

[57] ABSTRACT

A brake-balancing valve of the type including a constant effective area subject to brake valve pressure and a variable effective area subject to brake chamber pressure, fluid pressure responsive feed valve means for delivering fluid from an inlet to the opposite side of the variable effective area to compensate for brake tare losses whereby the proportioned brakes perform their proper share of braking effort, the feed valve being responsive to the pressure acting on the opposite side of the variable diaphragm whereby a constant compensating pressure is delivered to the opposite side of the diaphragm under all conditions. The invention also includes an improved two-arm articulated lever means which provides over travel for severe axle movement.

8 Claims, 3 Drawing Figures

Patented Feb. 29, 1972

INVENTORS
BRIAN C. DEEM
GUENTER K. HEROLD

BY
Scrivener Parker Scrivener + Clarke
ATTORNEYS

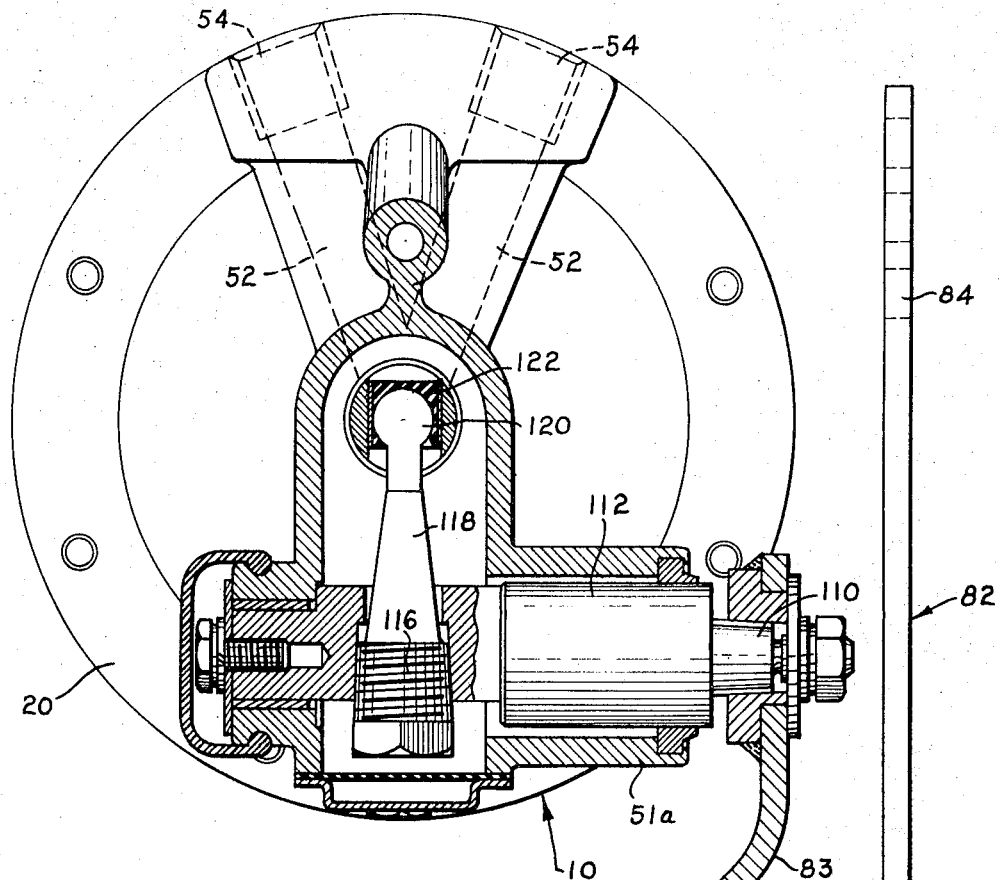
Fig. 2
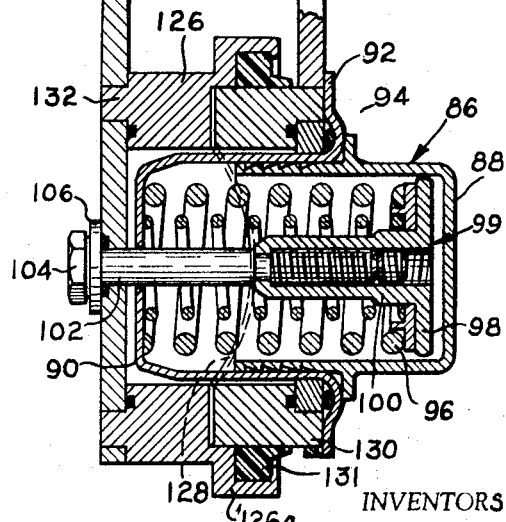
INVENTORS
BRIAN C. DEEM
GUENTER K. HEROLD
BY
Scrivener Parker Scrivener & Clarke
ATTORNEYS

BRAKE-BALANCING VALVE WITH BRAKE TARE COMPENSATING MEANS

This invention relates to brake-balancing valves for limiting braking effort in proportion to the load on selected wheels or axles of a vehicle.

The present invention is concerned with that type of valve shown in the patent to Pekrul U.S. Pat. No. 3,302,982 wherein brake valve pressure is delivered to a constant area piston with the pressure force thereon being balanced by brake chamber pressure acting on a variable diaphragm to limit the pressure delivered to the brake chamber to a value proportionate to the load on the wheel or axle being served by the valve.

Such valves are usually designed so that when the vehicle is empty, the valve delivers to the brake chamber a pressure having a ratio to brake valve pressure on the order of 1:4 with an empty vehicle and 1:1 with the vehicle fully laden with approximately 5 p.s.i. being required to overcome spring and friction losses, known as "brake tare", in order to move the brakeshoes to the point of brake impending. It will thus be seen that where the vehicle is empty and brake valve pressure is 25 p.s.i., without compensating for brake tare, the proportioning valve will deliver to the brake chamber served by it no more than 5 p.s.i. before the proportioning valve laps which may be just enough to overcome brake tare but thereafter does not permit any additional pressure to flow to the proportioned brake chambers so that they do not exert their share of effective braking effort.

Heretofore, attempts to compensate for brake tare have been resorted to, a preferred means being by the delivery of compensating fluid pressure to the side of the variable area diaphragm opposite the side which is subjected to brake chamber pressure. When a predetermined brake valve pressure of about 5 p.s.i. has been reached, a shutoff valve responsive solely to brake valve pressure is operated to disconnect the compensating space from the brake valve pressure. Such an arrangement is shown in the patent to Pekrul U.S. Pat. No. 3,302,982 mentioned above.

The drawback of an arrangement employing a shutoff valve responsive solely to a predetermined level of brake valve pressure is that when the compensating pressure has been initially admitted to the upper side of the variable area diaphragm and the shutoff valve closed, when brake pressure acting on the constant area piston moves the diaphragm downwardly the volume above the diaphragm is increased and the pressure in the compensating area obviously must fall with no means being now provided to restore the pressure to the proper level to compensate accurately for brake tare in view of the fact that the shutoff valve is maintained closed by any brake valve pressure in excess of 5 p.s.i. and the proportioned brakes still do not perform their proper share of braking effort.

The object of the present invention is to overcome the foregoing difficulty by providing a proportioning valve which substitutes for the shutoff valve of the type described, a feed valve which is responsive to the pressure in the compensating cavity of the proportioning valve and is constructed and arranged to feed into the cavity a supply of fluid sufficient to maintain at all times a pressure in the cavity equal to the preselected compensating or tare pressure regardless of the volume which may exist in the compensating cavity due to a particular load or lack thereof on the vehicle.

Another object of the invention is to provide an improved brake-balancing valve which includes an improved load-responsive control arm for effecting setting of the proportioning means in accordance with the load.

Referring now to the drawings:

FIG. 2 is a horizontal cross-sectional view taken substantially on the line 2—2 of FIG. 1.

Figure 1:
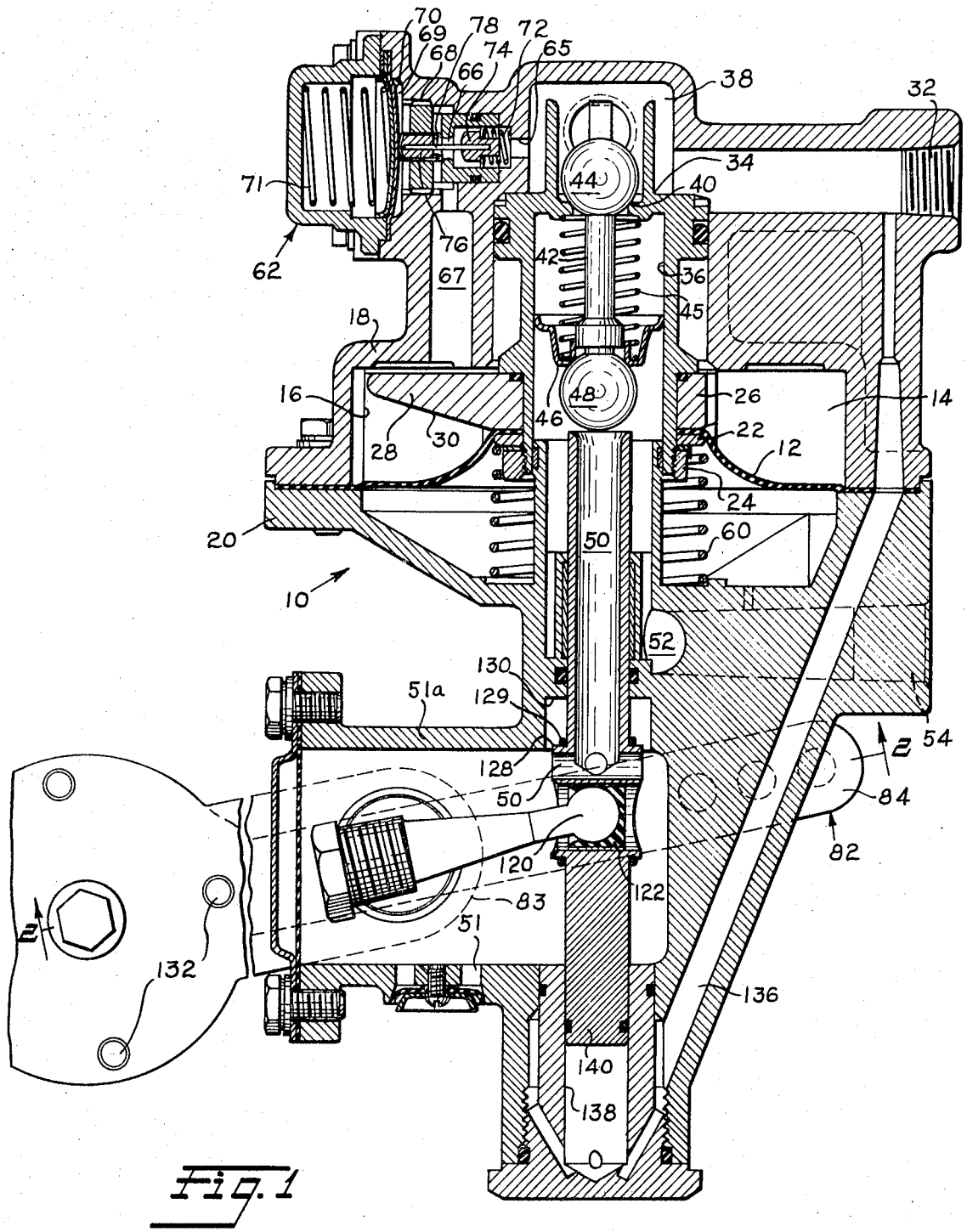
FIG. 1 is a vertical cross-sectional view of a proportioning valve incorporating the features of the present invention.

Referring now to the drawings, the numeral 10 designates a valve which in many respect is substantially identical to prior valves as, for example, the valve shown in the patent to Pekrul U.S. Pat. No. 3,302,982 and includes a diaphragm 12 which, in the position of FIG. 1, engages a plurality of inwardly extending radial fingers 14 fixed to the annular wall of a cavity 16 on the upper side of the diaphragm 12.

The outer periphery of the diaphragm 12 is clamped between upper and lower casing members 18, 20 of the valve body 10 and the inner periphery of the diaphragm is clamped between a ring 22 backed up by a threaded collar 24 and an annular member 26 having a plurality of outwardly extending movable fingers 28 whose lower edges 30 slope upwardly and outwardly and are adapted to engage the upper side of the diaphragm 12 and progressively strip it away from the fixed fingers 14 when pressure from a brake valve is delivered by way of a port 32 to the upper side of a constant area piston 34 having a central passage 36 therethrough. The passage 36 connects with an inlet cavity 38 and inlet port 32 through a valve seat 40 controlled by a double valve 42 whose upper end 44 is urged into closed position against the seat 40 by a spring 45 which acts downwardly on a valve guide 46 engaging a lower valve member 48 adapted to close the upper end of an exhaust pipe 50 which is positioned in accordance with load between the upper position shown in the drawing, which is its position when the vehicle is fully loaded and a lowered position to which it is moved by means hereinafter described when the vehicle is empty. As can be seen the exhaust pipe 50 is connected to atmosphere by way of lateral ports 50' and an exhaust port 51 in a housing port 51a.

When brake valve pressure operates on the constant area piston 34, the latter is moved downwardly against the upward force of a spring 60 until the valve element 48 closes off the exhaust passage through the exhaust pipe 50 with continued movement of the piston 34 thereafter causing the valve seat 40 to draw away from the upper valve member 44 and admit brake valve pressure to the brake chambers by way of a passage 52 and port 54. As pressure fluid flows into the brake chamber it simultaneously builds up against the underside of the diaphragm 12 until the upward force on the diaphragm 12 is equal to the downward force on the constant area piston 34 whereupon the spring 60 moves the assembly upwardly until the valve elements 44, 48 lap and no further pressure is delivered to the brake chamber until such time as the brake valve is opened further whereupon the valve element 44 is again disengaged from the seat 40 and additional fluid pressure is admitted to brake chamber in a manner well recognized in the art and requiring no further description. As previously mentioned the parts of the valve shown in FIG. 1 are positioned for a fully laden vehicle where it is desirable that the fluid pressure delivered to all of the brake chambers including those served by the proportioning valve will be equal.

When the vehicle is empty, the exhaust pipe 50 is depressed by load-responsive lever means to be described to its lowermost position so that the upper end of the exhaust pipe 50 is positioned downwardly a substantial distance from the exhaust valve element 48. Under these circumstances, when the brake valve is depressed the pressure again acts downwardly on the constant area piston 34 to move the assembly downwardly and as this takes place the diaphragm is progressively stripped away from the underside of the fixed fingers 14 as it is progressively engaged by the movable fingers 28 so that when the exhaust valve 48 eventually engages the upper end of the exhaust pipe 50 the diaphragm is substantially entirely clear of the fixed fingers 14 and is engaged almost entirely by the movable fingers. Thus the effective area of the diaphragm is now substantially the entire cross-sectional area of its underside and it will thus be seen that a brake chamber pressure substantially less than the brake valve pressure will effect lapping of the valve elements 44, 48. In actual practice, for a fully empty vehicle it is desirable that the brake valve pressure be related to brake chamber pressure in the ratio of approximately 4:1. In other words, when the effective braking effort delivered by the brake valve to the nonproportioned brake chambers is 20 p.s.i. the effective braking effort delivered to the proportion brake chambers should be 5 p.s.i. if the proportioned brakes are to perform their proper share of braking effort.

However, it has been determined that it takes approximately 5 p.s.i. merely to overcome brake tare losses of friction and spring forces before any braking effort is actually performed. Thus, where the effective braking effort delivered to the nonproportioned brakes is 20 p.s.i., which is the most frequently used pressure for normal braking, 5 p.s.i. will be delivered to the proportion braked, but this pressure is only sufficient to overcome brake tare forces with no pressure force left over to be applied to the stopping of the vehicle so that all of the actual braking effort is borne solely by the nonproportioned brakes.

The present invention compensates for brake tare losses by delivering fluid pressure to the opposite side of the variable area diaphragm but to avoid the problems occasioned by the use of a shutoff valve responsive solely to brake valve pressure as explained above, the present invention provides a feed valve generally designated by the number 62 in FIG. 1, which is responsive to pressure in the compensating cavity 16 above the variable diaphragm 12. Brake valve pressure is initially delivered to the cavity 16 by way of a port 65, a second port 66 and a passage 67 in the body of the valve 10. At the same time, brake valve pressure feeds through passage 68 to a cavity 69 containing a diaphragm 70 and when the pressure delivered to the cavity 69 equals the level required to compensate for brake tare, the diaphragm 70 is moved to the left against the force of a spring 71 enabling a second light spring 72 to move a valve element 74 against the port 66 closing it off. It will be noted that under no-pressure conditions the valve element 74 is normally retained open by the diaphragm 70 which acts on a valve guide 76 connected to the element 74 by a rod 78.

When brake valve pressure operates on the constant area piston 34 to move this downwardly, the volume of cavity 16 above the proportioning diaphragm 12 increases while the pressure therein decreases so that the force acting on the feed valve diaphragm 70 falls below the opposing force of the spring 71 which moves the diaphragm to the right in FIG. 1 to reopen the valve 74 and admit an additional supply of pressure fluid to the compensating cavity 16 until the proper tare pressure is reestablished therein whereupon the diaphragm 70 is moved by this pressure to the left enabling valve 74 to again close whereby a constant compensating pressure is maintained in the cavity 16 regardless of the change of volume thereof. Upon release of brake valve pressure, the pressure in cavity 16 acts to the right against the valve element 74 to move it to open position independently of the diaphragm 70 which immediately returns to the position of the drawings to retain the valve 74 open as soon as the pressure in the cavity 16 has fallen below the predetermined compensating pressure.

As previously mentioned, the valve of the invention is connected to the sprung part of a vehicle and lever means for positioning the exhaust tube 50 in accordance with load is connected to the unsprung or axle part of the vehicle. In order to prevent damage to the valve due to unusually large bumps, the present invention provides a novel yielding lever comprising a first arm 82 having a free end 84 containing a series of openings for connecting the arm to a vehicle axle. The opposite end of the arm 82 is articulated to the corresponding end of a second arm 83 by means of a hollow container 86 composed of a member 88 which is received with a force fit within a second member 90 with the two members having mating annular flanges 92, 94 as shown. Within the container 86 are a pair of springs 96, which are compressed between the inner wall of the container and the flange 98 of a spring retainer 99 having a threaded neck 100 engaged by a bolt 102 whose head 104 engages through a washer 106 the end of the second arm member 83 which is rigidly connected at its other end to the splined end 110 of a valve-operating shaft 112 journaled at its opposite ends in the housing part 51a. Secured to the shaft 112 intermediate its ends by a suitable threaded connection 116 is a lever 118 having a spherical end 120 rotatably received in a circular plastic shoe 122 slidably received in an opening in the lower part of the exhaust tube 50.

Each of the arms 82, 83 carries a respective annular member 124, 126 coaxially surrounding the container 86 and having confronting interengaging, fast rising cam surfaces 128 with the cam surface of one of the annular members nesting within the surface of the other, the two surfaces being retained releasably interengaged through the action of the spring members 96. As can be seen in FIGS. 1 and 2 the ends of the arms 82, 83 are circular and are provided with openings through which bosses 130, 132 integral with the annular members 124, 126 respectively, extend whereby the annular members are positively driven by the arms 82, 83. The member 126 has an annularly recessed shoulder 126a containing a dirt and moisture seal 131 whose inner surface engages the outer surface of the member 124.

Immediately above the lateral parts 50′ of the exhaust tube 50 is a shoulder 128 surmounted by an O-ring 129 which is adapted to engage a fixed shoulder 130, which serves as a stop for the shoulder 128 and tube 50 whenever an unusually large bump causes the lever means to tend to effect upward overtravel of the tube 50. Upon this occurrence the two parts of the lever means yield with respect to each other and thus prevent damage to the valve.

In operation and assuming the vehicle is fully loaded so that the chassis has moved toward the axle so as to position the lever arms 82, 83 in the position of FIG. 1, it will be apparent that the arms fulcrum as a unit about the axis of the operating lever 112 to position the exhaust tube 50 in its upper position immediately below the exhaust valve element 48. Obviously, rotation of the arms 82, 83 to a new angular position as a result of load change repositions the exhaust tube in proportion to load. As a further insurance that the exhaust tube is retained in its proper position during brake application, fluid pressure from the brake valve is delivered by way of a passage 136 to a cylinder 138 slidably and sealingly receiving a piston member 140 which is actually an integral part of the lower end of the exhaust pipe 50. Thus when the brake valve is opened fluid pressure is delivered directly from the brake valve to the cylinder 138 and this pressure plus the frictional resistance of the exhaust tube is adequate damping to prevent any jounce producing reciprocation of the exhaust tube during brake application.

Figure 3:
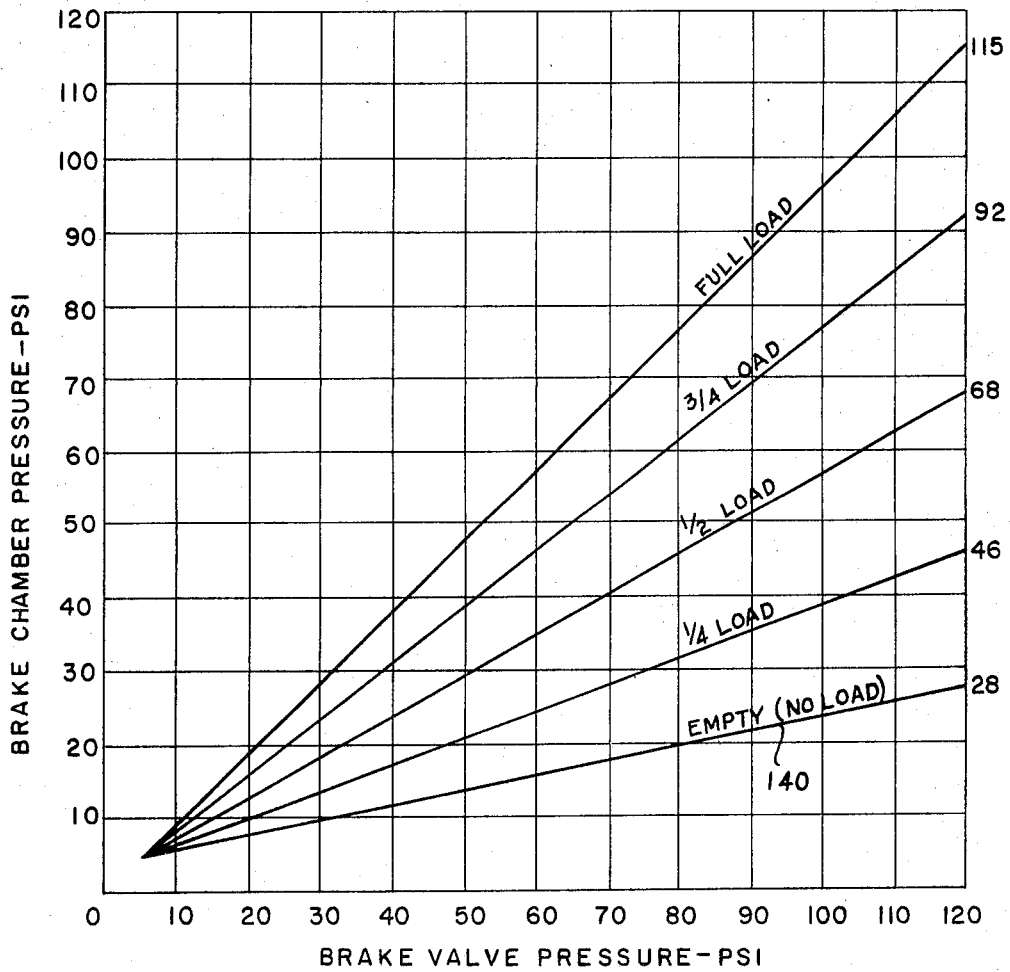
FIG. 3 is a graphical representation of characteristics of the valve of the present invention.

FIG. 3 is a graphical representation of the characteristics of the valve of the present invention. The representation if for an actual valve constructed in accordance with the invention wherein the maximum load ration was 4.7 to 1 with a 5 p.s.i. tare pressure.

As can be seen, by the use of the present invention for all load conditions of a vehicle, initial brake valve and brake chamber pressure are equal at 5 p.s.i. which represents the tare pressure. Thereafter brake chamber pressure for the proportioned brakes is always greater than 5 p.s.i. with the excess pressure being utilized as the properly proportioned share of braking effort exerted by the proportioned brakes. For example, and with reference to the line 140 representing empty condition when the brakes are applied with a 20 p.s.i. brake valve pressure, the brake chamber pressure for the proportioned brakes is 8 p.s.i., 3 p.s.i. being thus available above the tare pressure of 5 p.s.i. to apply the proportioned brakes so that they perform their proper share of braking effort.

What is claimed is:

1. A brake-balancing valve for supplying to a brake chamber pressure proportional to vehicle load comprising a housing having an inlet, an outlet and an exhaust, a differential pressure responsive member in said housing having a changeable ratio of its effective areas and including a double valve for controlling the flow of fluid between said inlet and outlet and said outlet and exhaust, said member having a constant effective area subjected to the pressure at the inlet and a variable effective area subjected on one side to pressure at said outlet, fluid pressure responsive feed valve means for controlling the flow of fluid from the inlet to the opposite side of said variable effective area and for disconnecting said area from said inlet in response to a predetermined pressure acting on the opposite side of said variable effective area, said last-named means including a fluid pressure responsive member subjected at all time to the pressure acting on said opposite side of said variable effective area.

2. The balancing valve of claim 1 wherein said feed valve means includes a port for supplying fluid from said inlet to the opposite side of said variable effective area, a valve element for controlling said port, said fluid pressure responsive member engaging said valve element, resilient means urging said fluid pressure responsive member to a position wherein said valve element is retained normally open and means for subjecting said member to pressure which has flowed from said inlet through said port to the opposite side of said variable effective area to effect closing of said valve element when the pressure acting on said opposite side reaches a value determined by said resilient means.

3. The balancing valve of claim 2 wherein said valve element includes a part for abutting engagement with said fluid pressure responsive member, and second resilient means at all times biasing said valve element toward its closed position.

4. The balancing valve of claim 3 wherein said valve element is between said inlet and said port and said fluid pressure responsive member is on the opposite side of said port and at all times in direct communication with the opposite side of said variable effective area.

5. The balancing valve of claim 4 including a part carried by said valve element for abutting engagement with said fluid pressure responsive member, said part extending through said port.

6. A brake-balancing valve including a housing having an inlet, outlet and an exhaust, said housing being connected to the sprung part of a vehicle, a differential pressure responsive member in said housing having a changeable ratio of its effective areas and including a double valve for controlling the flow of fluid between said inlet and outlet and from said outlet to said exhaust, said member having a constant effective area subjected to the pressure at said inlet and a variable effective area subjected to pressure at said outlet, fluid pressure responsive feed valve means for controlling the flow of fluid from the inlet to the opposite side of said variable effective area, said exhaust including a movable exhaust tube cooperating with said double valve, and lever means for positioning said tube in accordance with load, said lever means including a pair of arms articulated together at one of their ends, the opposite end of one of said arms being rotatably connected to the unsprung part of the vehicle and the opposite end of the other arm being operatively connected to said exhaust tube, a pair of complementary interengaging, annular fast rising cams carried by the articulated ends of said arms, and yielding resilient means urging said cams into tight engagement with each other and at all times tending to restore said cams into interengaging relationship with each other while enabling the arm connected to the unsprung part of the vehicle to yield with respect to the second arm when bouncing conditions tend to effect overtravel of the parts of the valve connected to said second arm.

7. The balancing valve of claim 6 wherein the arms are substantially parallel to each other and extend in the same direction in side by side relationship from their interconnected ends.

8. The balancing valve of claim 6 wherein said resilient means includes a hollow container coaxial with said annular cams, a rod having a head part engaging one of said arms and extending into said hollow container and having a second head part within said container, and spring means compressed between said second head part and the opposing inner wall of said container.

* * * * *